Patented Jan. 10, 1933

1,894,135

UNITED STATES PATENT OFFICE

GABRIEL TÖRÖK AND GEORG BECZE, OF BUDAPEST, HUNGARY

MAKING DOUGH AND BREAD

No Drawing. Application filed December 15, 1930. Serial No. 502,616, and in Hungary December 27, 1928.

Our invention refers to the preparation of dough for the manufacture of bread and the like and has particular reference to means whereby the rising of the dough is improved in such manner that the drying of the baked product is retardated as far as possible.

As is well known to those skilled in the art, when producing bread or other baker's wares, two points are of prime importance, viz. the production of a voluminous bread, which can only be obtained by a correspondingly voluminous and quick development of gas, and the retardation of the drying and ageing, which can only be attained by causing alterations in the dough during the rising and baking which guarantee a sufficient decomposition of its constituents.

As regards the two principal types of bread production nowadays in use, one being the process of yeast fermentation, the other the process of leaven fermentation, the following facts can be ascertained.

In the pure yeast fermentation process the development of gases is a very satisfactory one as far as the quantity and also the duration is concerned, however the degree of acidity (hydrogen ion concentration) in the dough is comparatively low and furthermore the activity of the diastatic and proteolytic enzymes of the yeast is as a rule low also and is capable only of decomposing certain kinds of albuminous compounds. For the same reasons the pasting-up of the starch is limited, as this process requires a higher hydrogen ion concentration.

Referring to the leaven fermentation, it is true, that owing to the lactic acid fermentation occurring during the several hours of rest the hydrogen ion concentration in the dough and also the activity of the enzyme are greater and therefore a farther reaching decomposition will take place. However the results will vary within wide limits, being dependent from the manner, in which the dough is being prepared, because the cultivation of the lactic acid bacteria is governed exclusively by the natural selection of the breed. Therefore the results are uncertain and in many cases unsatisfactory, the development of gas is frequently a poor one.

It has already been suggested to overcome the uncertainty of dough preparation by adding an acid or certain acid-forming bacteria cultures in order to secure a corresponding rising (swelling) of the dough. The addition of an acid is not satisfactory because it will merely result in an acid effect, not in the enzymatic effect obtained by the addition of bacteria. The addition of bacteria cultures is accompanied by increased uncertainty and danger, for hitherto no means were known for ascertaining the correct proportions of yeast and bacteria, no exact dosing being possible.

We have ascertained by a great number of tests, that it is by no means immaterial, in what proportion bacteria are added to a yeast dough, when preparing same, but that this proportion will decide, whether a satisfactory, a too weak or too vigorous effect is obtained. In the two cases last mentioned an unsatisfactory result will be obtained, so that a predetermined proportion must be kept up in order to attain a safe and satisfactory result. In other words only a predetermined number of bacteria must be used for a predetermined number of yeast cells, at least one bacterium being required for each yeast cell. However this proportion may be varied according to the time required in each individual case for forming the dough, in the direction of an increase of the number of bacteria.

In accordance with this result of our investigations our invention consists in the first line in the production of a mixture of yeast and bacteria for the manufacture of bread and other baker's ware, in which the yeast cells and the bacteria are present in a predetermined proportion, at least one acid-forming bacterium or one capable of effecting decomposition being present per yeast cell.

Mixtures of this kind may be prepared in different ways. We may for instance simply mix a predetermined number of yeast cells with the corresponding number of bacteria. We may however also first of all cause the separating out of the bacteria on a predetermined quantity of a suitable carrier and thereafter mix the preparation thus obtained with the yeast cells. We may also mix the bacteria preparation with the yeast right in the dough, preferably under the form of a fresh preparation or one, which has been dried at low temperature. Of the acid-forming bacteria we prefer using lactic acid bacteria, a mixture of different kinds of these bacteria, in certain cases cultures of yoghurt etc., but the acid-forming bacteria may also be replaced partly or altogether by other decomposing bacteria, for instance by mildew.

In practising our invention we may for instance proceed as follows:

*Example 1.*—In 100 liters of a sterile malt extract of 4° Balling 5-10 litres of a four days' lactic acid culture on malt extract are introduced under stirring and the mixture is kept 6-7 days at 43-46° C. We then determine the number of bacteria in 1 ccm of this suspension by counting the bacteria in a well known manner in the Thoma-Zeiss Chamber (as described in Henneberg's "Handbuch der Gärungsbakteriologie," vol. I, p. 186 (1926)). At the same time fresh baker's yeast is mixed with the threefold quantity of water under stirring. The number of yeast cells in 1 ccm of this suspension is also determined in a similar manner by counting the cells. We are thus enabled to add to the mash containing the bacteria such a quantity of the yeast suspension, that to each yeast cell corresponds at least one bacterium. This mixture is now separated from the mash and thoroughly kneaded. Separation of the bacteria can be effected in any desired manner, preferably by filtering twice, the layer first remaining on the filter being instrumental in safely retaining the bacteria during the second filtration. If desired, the mixture is compressed and is then ready to be added to the dough.

*Example 2.*—The desired kind of bacteria is bred and their number ascertained as described with reference to Example 1. Into each litre of this suspension of bacteria a quantity of a carrier, for instance coagulated albumen and preferably coagulated casein, varying between 1 and 5 grams is added, the bacteria being thus separated out on this carrier. The preparation thus obtained is now mixed with the corresponding quantity of yeast.

*Example 3.*—The preparation of a carrier with bacteria separated out thereon, as described with reference to example 2, is mixed with the corresponding quantity of yeast in the dough itself.

*Example 4.*—The bacteria used according to examples 1, 2 or 3 may be replaced partly or altogether by suitable kinds of mildew.

*Example 5.*—Any of the preparations obtained in accordance with examples 1-4 is dried at about 40-50° C. in such manner that the bacteria are not killed. We thus obtain a preparation which can be stored a long time and on being subjected to a short preliminary treatment, for instance by treating it during 30-60 min. at 40-50° C. with a 5-10 per cent sugar solution, will become equal in value to a fresh, non-dried preparation. We may however even dispense with this preliminary treatment and simply mix the dry preparation with dry yeast.

The dosing of the yeast and bacteria renders it possible for the baker to exactly predetermine the properties of the bread to be produced by adding a predetermined quantity of the yeast product, the exact composition of which is known to him, the product being moreover stable so as not to change its composition. Stability is imparted to the product because it does not contain the nutrient medium of the yeast cells and bacteria, so that these cells and bacteria cannot develop further and increase in the product.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:—

1. The method of treating dough comprising adding to the dough a yeast preparation containing a quantity of bacteria, capable of causing decomposition and separated from their nutrient medium which corresponds to the acidity and degree of decomposition to be attained in the baked product.

2. The method of treating dough comprising adding to the dough a yeast preparation containing a quantity of acid-forming bacteria capable of causing decomposition and separated from their nutrient medium which corresponds to the acidity and degree of decomposition to be attained in the baked product.

3. The method of treating dough comprising adding to the dough a yeast preparation containing a quantity of bacteria, capable of causing decomposition, separated from their nutrient medium, which corresponds to the acidity and degree of decomposition to be attained in the baked product.

4. The method of treating dough comprising adding to the dough a yeast preparation which contains per yeast cell at least one bacterium capable of causing decomposition, separated from its nutrient medium.

5. The method of treating dough comprising adding to the dough a yeast preparation which contains at least one acid-forming bacterium per yeast cell, separated from its nutrient medium.

6. As a new product, a yeast preparation containing per yeast cell at least one bacterium capable of causing decomposition and separated from its nutrient medium.

7. As a new product, a yeast preparation containing per yeast cell at least one acid-forming bacterium capable of causing decomposition and separated from its nutrient medium.

8. As a new product, a yeast preparation containing per yeast cell at least one lactic acid bacterium separated from its nutrient medium.

9. As a new product, a yeast preparation containing bacteria capable of causing decomposition and separated from its nutrient medium.

10. As a new product, a yeast preparation containing lactic acid bacteria separated from their nutrient medium.

11. The method of producing a product as claimed in claim 6 comprising breeding bacteria, capable of causing decomposition, in a suitable mash, adding the calculated number of yeast cells and separating the solid matter from the liquid containing the nutrient medium.

12. The method of producing a product as claimed in claim 6 comprising breeding bacteria, capable of causing decomposition, in a suitable mash, adding the calculated number of yeast cells, separating the solid matter from the liquid containing the nutrient medium and compressing same.

13. The method of producing a product as claimed in claim 6 comprising breeding bacteria, capable of causing decomposition in a suitable mash, causing separation of the bacteria from their nutrient medium on a calculated quantity of a carrier, and adding the calculated number of yeast cells.

14. The method of producing a product as claimed in claim 6 comprising breeding bacteria, capable of causing decomposition in a suitable mash, causing separation of the bacteria from their nutrient medium on a calculated quantity of a carrier, and mixing said bacteria with the calculated quantity of yeast cells in a body of dough.

15. The method of producing a product as claimed in claim 6 comprising breeding bacteria, capable of causing decomposition, in a suitable mash, separating the solid matter from the liquid containing the nutrient medium, drying said solid matter at a temperature which is not injurious to the bacteria and mixing the dried bacteria with a calculated quantity of dried yeast cells.

16. The method of producing a product as claimed in claim 6 comprising breeding bacteria, capable of causing decomposition, in a suitable mash, separating the solid matter from the liquid containing the nutrient medium, drying said solid matter at a temperature which is not injurious to the bacteria, treating the dried product at 40–50° C. with sugar solution and mixing the product thus treated with a calculated quantity of yeast cells.

In testimony whereof we affix our signatures.

GABRIEL TÖRÖK.
GEORG BECZE.